United States Patent [19]

Flemm et al.

[11] Patent Number: 4,497,994
[45] Date of Patent: Feb. 5, 1985

[54] CONTACT DEVICE FOR RESISTANCE SPOT WELDER

[75] Inventors: Roy E. Flemm, New Kensington; James R. Morran, Apollo, both of Pa.

[73] Assignee: Aluminum Company of America, Pittsburgh, Pa.

[21] Appl. No.: 465,317

[22] Filed: Feb. 9, 1983

[51] Int. Cl.³ .............................................. B23K 11/30
[52] U.S. Cl. ..................................... 219/109; 219/119
[58] Field of Search ........................ 219/109, 110, 119

[56] References Cited

U.S. PATENT DOCUMENTS 2,370,009  2/1945  Clarke et al. ......................... 219/110
3,335,258  8/1967  Barnhart et al. ..................... 219/110
3,578,942  5/1971  Bugaj ................................. 219/119

Primary Examiner—Roy N. Envall, Jr.
Assistant Examiner—Alfred S. Keve
Attorney, Agent, or Firm—Elroy Strickland

[57] ABSTRACT

Means for making electrical contact with a pair of spot welding electrodes and workpieces engaged by the electrodes. The means includes two rigid insulating blocks for mounting on each electrode of an electrode pair. Each block has a first electrical conductor for physically engaging the electrode upon which it is mounted and a second electrical conductor for physically engaging an exposed surface of the workpiece the electrode will engage in a welding process. The electrical conductors extend in a direction substantially perpendicular to the electrodes when the blocks are mounted thereon. In addition, means integral with the blocks and conductors for respectively electrically connecting the conductors to a device for measuring the voltage drop between electrodes and between the exposed surfaces of the workpieces when welding current is applied to the workpieces by the electrodes.

1 Claim, 3 Drawing Figures

CONTACT DEVICE FOR RESISTANCE SPOT WELDER

BACKGROUND OF THE INVENTION

The present invention relates to means for making electrical contact with a pair of electrical resistance, spot welding electrodes and the workpieces engaged by the electrodes. More particularly, the present invention relates to means for use in dynamically measuring the voltage drop that occurs between the electrodes and between exposed surfaces of the workpieces during spot welding of the workpieces.

A need has existed in the welding industry for a device or means that can accurately and reliably detect and convey voltage signals for use in measuring the drop in voltage that occurs between welding electrodes and between the exposed surfaces of the workpieces being welded when welding current is supplied to the workpieces by the electrodes. Such a device or means is most useful for real time monitoring of the resistance spot welding process to determine weld quality, for example.

Previously, hand-held voltage probes have been used in the measurement of true dynamic alternating current voltage drops across the weld zone in resistance spot welding of the workpieces. An example of such a hand-held unit consisted of a pair of hinged insulating blocks having therebetween leafed conductive foil strips alternating with leafed nonconductive material strips for insulating the foil strips from each other. Such a probe required a considerable amount of time to correctly align the conductive strips with the electrodes and workpieces and also required someone to hold and correctly maintain engagement of the probe with the electrodes and workpieces. During the welding operation, such a probe did not reliably, accurately and repeatedly convey the voltage signals, as the probe was inadvertently moved by the person holding it in contact with the electrodes and workpieces, and the movement of the electrodes and the workpieces during welding made it difficult to maintain electrical contact. By losing contact with the electrodes or workpieces, signals were lost during the critical welding time or unwanted noise was introduced into the desired signals.

Further, a conductive strip for contacting a workpiece surface sometimes became welded to the workpiece as the result of the expulsion of metal from the weld zone. This resulted in the probe being unusable until the conductive strip or strips were replaced.

Although not designed for use in dynamic voltage measurements during welding, an electrode mounted probe has been used in the measurement of direct current static resistance across a weld zone before the application of welding current to the workpieces by the electrodes. This probe consisted of two insulating blocks, each of which was respectively fastened to an electrode of an electrode pair. Each block had a spring-loaded voltage probe with a pointed end for contacting the exposed workpiece surface; the probe was located in parallel relation to the electrode when the block was mounted thereon. Each block also had a current clamp and a voltage clamp which attached to the respective electrode for picking up the voltage and current signals at the electrodes. Each block further had separate leads from the workpiece, voltage probe, current clamp and the voltage clamp for connection to the resistance measurement means.

Such electrode mounted probes were not suitable for use in measuring the voltage drop during actual welding because of the significant level of noise induced in the probes by magnetic fields generated in the electrodes and workpieces caused by the flow of alternating current welding current therethrough. With probes disposed parallel to the electrode, the magnetic field generated by welding current was directly coupled to the probes.

It is desirable, therefore, to provide a probe structure that avoids the above problems. Such structure should have high durability and simplicity for accurate, reliable and repeatable detection and transfer of voltage signals at the electrodes and at the exposed surfaces of the workpieces during actual welding.

SUMMARY OF THE INVENTION

The present invention provides a structure for making electrical contact with a pair of spot welding electrodes and the workpiecs engaged by the electrodes. The structure comprises two rigid insulating blocks adapted for mounting on the respective electrodes of the electrode pair. Each block has a first electrical conductor integral therewith and disposed for physically engaging the respective electrode when the blocks are mounted on the electrodes. Each block also has a second electrical conductor integral therewith and disposed for physically engaging an exposed surface of the respective workpiece engaged by the respective electrode. The first and second electrical conductors extend in a direction substantially perpendicular to the axes of the electrodes when the blocks are mounted thereon. Means integral with the blocks are also provided for respectively electrically connecting the electrical conductors to a device for measuring the voltage drop that occurs between the electrodes and between the exposed surfaces of the workpieces when welding current is applied to the workpieces by the electrodes.

It is desirable that each block have third and fourth integral conductors for transferring electrical signals provided by the conductors of one block to third and fourth integral conductors on the other block when the blocks are brought toward each other in a welding process. The signals of the one block are thereby conveyed to the voltage measuring device via the third and fourth electrical conductors of the other block. The third and fourth electrical conductors also extend in a direction substantially perpendicular to the axes of the electrodes when the blocks are mounted thereon.

It is desirable that the first through fourth electrical conductors comprise metallic strips and integral contact means.

It is also desirable that the rigid insulating blocks have generally planar sides and surfaces and, more preferably, that each of the rigid blocks be rectangular in shape.

It is an objective of the present invention to provide means for detecting and conveying substantially noise-free voltage signals at the respective electrodes and at the exposed surfaces of the workpieces during resistance spot welding to a voltage measuring device to obtain dynamic voltage measurements of the voltage drop occurring between the electrodes and between the exposed surfaces of the workpieces.

It is a further objective of the present invention that such means be accurate, durable, repeatable, reliable and simple.

The above-mentioned and other objectives and advantages of the present invention will be more fully appreciated and understood by consideration of the following detailed description and drawings appended thereto.

DESCRIPTION OF THE PREFERRED EMBODIMENTS

Figure 1:
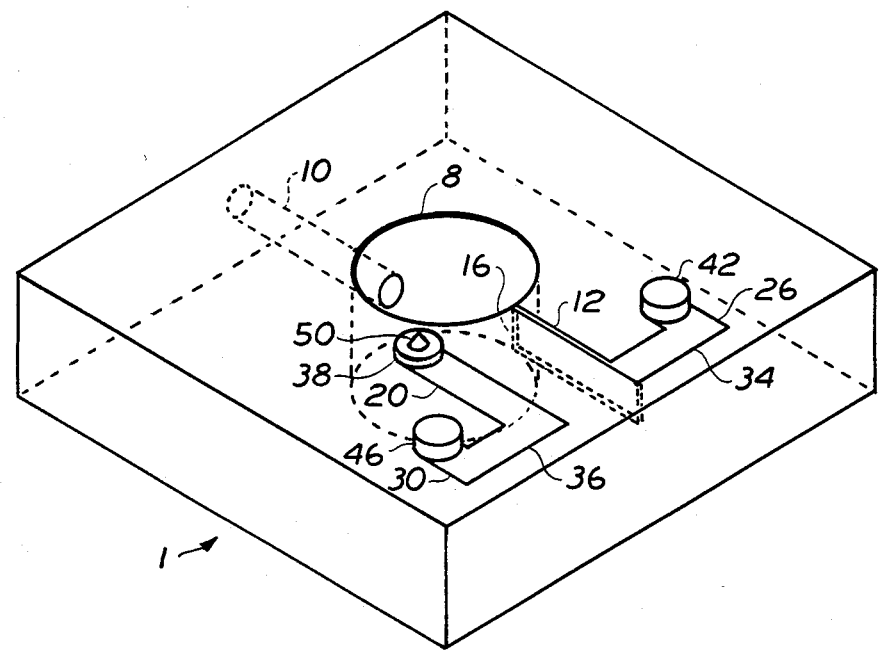
FIG. 1 is a perspective view of one of two rigid insulating blocks of the present invention, the block having first through fourth electrical conductors integral therewith.
Figure 2:
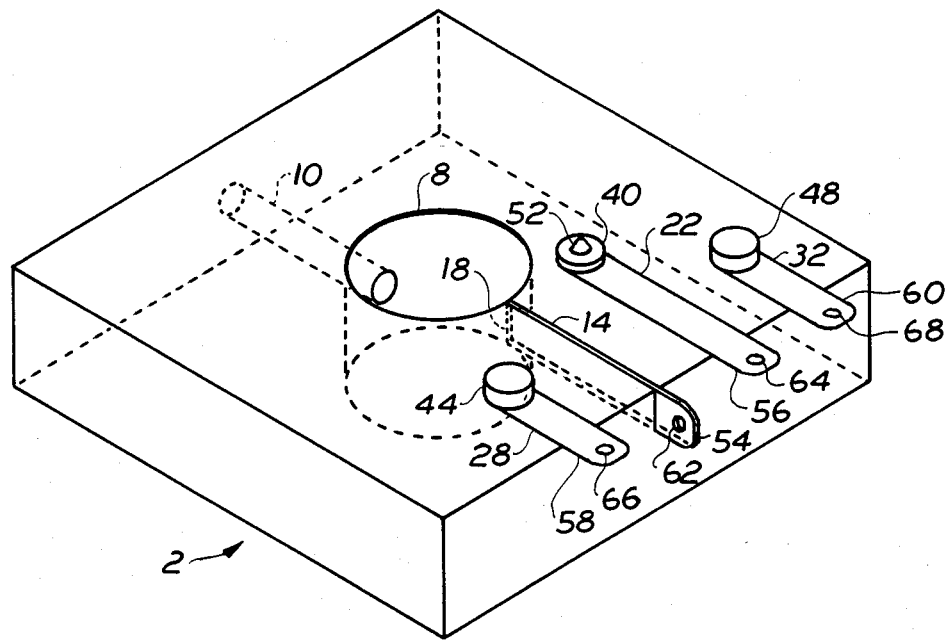
FIG. 2 is a perspective view of the other of the rigid insulating blocks of the present invention, this block also having first through fourth electrical conductors integral therewith.

Referring now to the drawings, FIGS. 1 and 2 show preferred means of the invention for making electrical contact with a pair of spot welding electrodes and workpieces engaged by the electrodes. The means comprises two rigid insulating blocks, 1 and 2, these blocks being made of heat resistant electrically insulating material. Blocks 1 and 2 are shown having generally planar sides and surfaces and are rectangular in shape.

In addition, the size and material of the blocks should be such that they are structurally sound so that they are resistant to breaking or cracking, as the invention is directed to a structure employable with commercial production type resistance spot welding apparatus. The blocks should also be of sufficient size to accommodate electrical conductors, as described hereinafter. Such size is also dependent upon such factors as, for example, the material composition of the blocks, the blocks' shape and usage.

Blocks 1 and 2 are adapted for mounting on the respective electrodes 4 and 6 (FIG. 3) of a pair of welding electrodes of spot weldng apparatus, not otherwise shown. Even though the blocks can be mounted on such electrodes in various ways, a preferred way includes an opening 8 provided in and extending through each block, the shape and size of the openings conforming to the shape and size of the respective electrodes.

A metallic screw (not shown) can be used to secure each block to its electrode. As shown in FIGS. 1 and 2, a channel 10 is provided in a portion of each block for receiving such a screw. Channel 10 is appropriately threaded and extends between opening 8 and an outside surface. Preferably the channel is aligned substantially perpendicular to the axis of opening 8.

Block 1 has a first electrical conductor 12 integral therewith and disposed for physically engaging the upper electrode 4 when the block is mounted thereon. Similarly, block 2 has first electrical conductor 14 for engaging lower electrode 6 when block 2 is mounted on the electrode. The conductors extend into openings 8 so that the ends thereof can make contact with electrodes 4 and 6. The locations of such ends are labeled 16 and 18, respectively.

Blocks 1 and 2 also have second electrical conductors 20 and 22, respectively. These conductors are too an integral part of their respective blocks and are disposed for physically engaging an exposed surface of respective workpieces 24 (FIG. 3) engaged by the electrodes.

The first electrical conductors 12 and 14 and the second electrical conductors 20 and 22 extend in a direction substantially perpendicular to the axes of the openings 8 and the electrodes 4 and 6 when the blocks are mounted thereon. Such alignment substantially eliminates signal noise induced in these conductors by the strong magnetic field surrounding the electrodes during actual welding.

In a preferred embodiment of the invention, each block has third and fourth integral conductors (26 and 30 on block 1, and 28 and 32 on block 2) for transferring electrical signals from one block to the other, as explained in detail hereinafter.

On block 1, third conductor 26 is shown electrically connected to first conductor 12, and fourth conductor 30 is shown electrical connected to second conductor 20 by laterally extending electrically conductors 34 and 36. These conductors can be provided by various methods, such as by soldered metal strips.

The third electrical conductors 26 and 28 and the fourth electrical conductors 30 and 32 also extend in a direction substantially perpendicular to. the axes of the openings 8 and electrodes 4 and 6 when the blocks are mounted thereon. As with conductors 12 and 14, the perpendicular alignment of these electrical conductors substantially reduces, if not eliminates altogether, signal noise in these conductors resulting from the magnetic field existing around the electrodes during actual welding.

As shown in FIGS. 1 and 2, the electrical conductors are comprised of metallic strips and integral contact means. First electrical conductors 12 and 14 have integral end portions or contact means at locations 16 and 18, respectively, as indicated earlier. Second electrical conductors 20 and 22 are depicted with integral contact means 38 and 40, respectively, for engaging the exposed surfaces of workpieces 24, while third conductors 26 and 28 are shown with integral contact means 42 and 44, respectively, which engage each other in a manner presently to be explained. Similarly, fourth conductors 30 and 32 are shown having integral contact means 46 and 48, respectively, which engage each other.

Preferably, integral contact means 38 and 40 of second electrical conductors 20 and 22, respectively, have pointed structures 50 and 52, respectively, for penetrating any oxide surface layer of the workpieces. Such pointed structures are desirable since they eliminate the need to consider the resistance of such oxide layer in determining a true voltage measurement across the exposed workpiece surfaces. Alternatively, the contact means for the second conductors could be of a generally conical shape having a pointed end for contacting the workpieces, or such other appropriate shape having a pointed structure or pointed end.

The integral contact means for the first, third and fourth electrical conductors may be button shaped or disc shaped, or such other shape, as appropriate.

The metallic strips and integral contact means comprising the electrical conductors are made from a good conductive material, such as copper or silver.

The electrical conductors may consist of other than metallic strips. Such other forms may be, for example, a printed circuit board having the requisite conductors with their appropriate contact means therein, such circuit boards being associated with the respective blocks.

The electrical conductors are made integral with the blocks by any of the methods known to those skilled in the art, such as by fastening the conductor to the block with screws or, where appropriate, fixing the conductor within the block, for example. Further, where appropriate, the contact means may have compression springs thereunder, such springs being countersunk in the respective block. Such springs may be desirable for maintaining good electrical contact at the contact means for signal detection or transfer, as appropriate.

Figure 3:
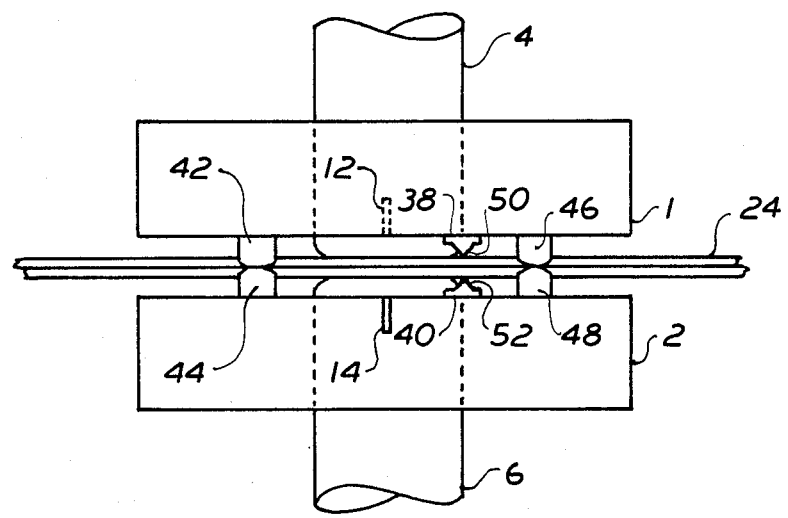
FIG. 3 is a front elevational view showing the blocks of FIGS. 1 and 2 mounted respectively on two, upper and lower, welding electrodes, with the electrodes engaging two workpieces.

FIG. 3 shows block 1 of FIG. 1 and block 2 of FIG. 2 respectively mounted on the electrodes 4 and 6 (FIG. 3) of spot welding apparatus, not otherwise shown. Electrodes 4 and 6 are shown engaging the two, face-to-face workpieces 24 to be welded together by the apparatus.

The operation of the means thus far described is as follows. Blocks 1 and 2 are positioned on electrodes 4 and 6, respectively, by directing the electrodes through openings 8 provided in the blocks. Set screws (not shown) are threaded through channels 10 to secure the blocks to the electrodes. The ends 16 and 18 of conductors 12 and 14 now engage the electrodes. The electrodes 4 and 6 are next brought to bear on the exposed surfaces of workpieces 24, as shown in FIG. 3, in the welding process, as alternating current flows through electrodes 4 and 6 and workpieces 24.

A voltage signal at electrode 4 is received by the contact end 16 of conductor 12 and is conveyed through conductor 12 to and through lateral conductor 34. From 34 the signal is conveyed through conductor 26 to its contact 42. As shown in FIG. 3, contact 43 engages contact 44 of conductor 28. The signal is thereby transferred from electrode 4 through conductor 28.

A voltage signal at electrode 6 is received by the contact end 18 of conductor 14 and is conveyed through conductor 14. From conductor 14 the signal is available for a voltage measuring device (not shown).

A voltage signal at the exposed workpiece surface facing block 1 (FIG. 1) is received by contact 38 of conductor 20 and by its integral pointed structure 50. The signal is conveyed through conductor 20, through lateral conductor 36 (FIG. 1) and through conductor 30 to its contact 46. Again as shown in FIG. 3, contact 46 engages contact 48 of conductor 32 (FIG. 2) thereby transferring the voltage signal therethrough and through conductor 32.

A voltage signal at the exposed workpiece surface facing block 2 is received by contact 40 of conductor 22 (FIG. 2) through its pointed structure 52 and is conveyed through conductor 22. From 22, the signal is available for measuring by a suitable device, again not shown.

For example, an integral extension of each conductor, as shown in FIG. 2 by outward projections 54, 56, 58 and 60 (of conductors 14, 22, 28 and 32, respectively), extends from block 2. The electrical conductors at the outward projections are connected to a device (not shown) for measuring the voltage drop that occurs between the electrodes and between the exposed surfaces of the workpieces during actual welding. Holes 62, 64, 66, and 68 are shown provided in the outward projections of conductors 14, 22, 28 and 32 for connecting appropriate leads respectively thereto. The dynamic voltage drop that occurs between the electrodes is obtained from voltage signals taken from conductors 14 and 28, and the dynamic voltage drop that occurs between the exposed surfaces of the workpieces is obtained from voltage signals taken from conductors 22 and 32.

From the figures, it can be seen that the electrical conductors are designed and made integral with the respective blocks and the blocks are so mounted on the electrodes such that the distance between the blocks, when secured to the welding electrodes, and when the electrodes engage the workpieces, will be substantially the combined thickness of the workpieces. The conductors may be partially or completely recessed in the blocks to aid in achieving such distance. Such distance is desirable for minimizing the introduction of signal noise in the conductors from the magnetic field generated by the current flow through the electrodes and workpieces during welding.

It is desirable when the blocks have generally planar sides and surfaces that at least the integral conductors disposed for contacting the workpieces, that is, the second electrical conductors, and any third and fourth conductors, be located in parallel relation to one side and surface. By parallel relation is meant substantially parallel to one side and surface. Such relation of the conductors is shown in FIGS. 1, 2 and 3. Such relation simplifies achieving a distance between the blocks, when secured to the welding electrodes, and when the electrodes engage the workpieces, that will be substantially the combined thickness of the workpieces. As previously mentioned, maintaining such distance is desirable for minimizing signal noise in the conductors.

The structure of the present invention includes means integral with the blocks for respectively electrically connecting the electrical conductors to a device for measuring the voltage drop that occurs between the electrodes and between the exposed surfaces of the workpieces when welding current is applied to the workpieces by the electrodes.

In embodiments of the invention not having the electrical signal transfer means of the third and fourth conductors, the first electrical conductor on each block would be electrically insulated from the second electrical conductor on that block. Each block would also have means integral therewith for respectively electrically connecting the first and second conductors on that block to a device for measuring the voltage drop that occurs between the electrodes and between the exposed surfaces of the workpieces during actual welding.

However, use of the electrical signal transfer means having the third and fourth conductors, allowing the signals of one block to be conveyed to the voltage measuring device via the third and fourth conductors of the other block, is desirable in many instances. Such desirability arises in simplifying the required connections to the voltage measurement device, which may further reduce the possibility of signal noise being introduced into the conductors, especially in those areas where the leads from the voltage measuring device connect to the connecting means of the blocks. Further, it is desirable that when the blocks have such electrical signal transfer means, the block having the integral means for respectively electrically connecting the electrical conductors to the voltage measuring device be mounted on the stationary electrode of the welding apparatus. Such mounting on the stationary electrode, rather than the moving electrode, enhances the durability of the connections to the measuring device by minimizing the possibility of disconnections because of repeated electrode movement as the welds are being made.

While the invention has been described in terms of preferred embodiments, the claims appended hereto are intended to encompass all embodiments which fall within the teachings, spirit and scope of the invention.

What is claimed is:

1. Means for making electrical contact with a pair of spot welding electrodes and workpieces engaged by the electrodes during a welding process, said means comprising:

two rigid insulating blocks adapted for mounting on the outside surfaces of respective electrodes of the electrode pair;

means for securing the blocks on and releasing the blocks from the electrodes;

a first electrical conductor integral with each of said blocks and disposed for physically engaging and electrically contacting the respective electrode when the blocks are mounted on the electrodes;

a second electrical conductor integral with each block and disposed for physically engaging and electrically contacting an exposed surface of the respective workpiece engaged by the respective electrode;

further electrical conductors integral with each block disposed to transfer electrical signals directed to the first and second electrical conductors of one block to the other block; said further conductors of the respective blocks being disposed in electrical contact with each other when the second conductors of the blocks engage the respective workpieces;

said electrical conductors extending in a direction substantially perpendicular to the axes of the electrodes when the blocks are mounted thereon; and means integral with the conductors for respectively electrically connecting the electrical conductors to circuit means located externally of the blocks such that the voltage drop that occurs between the electrodes and between the surfaces of the workpieces when welding current is applied to the workpieces by the electrodes can be measured.

* * * * *